C. W. EBELING.
FILM CONTROLLED MECHANISM FOR SYNCHRONIZED MOTION PICTURE AND SOUND RECORD CARRIERS.
APPLICATION FILED NOV. 18, 1916.
1,254,487.
Patented Jan. 22, 1918.
2 SHEETS—SHEET 1.
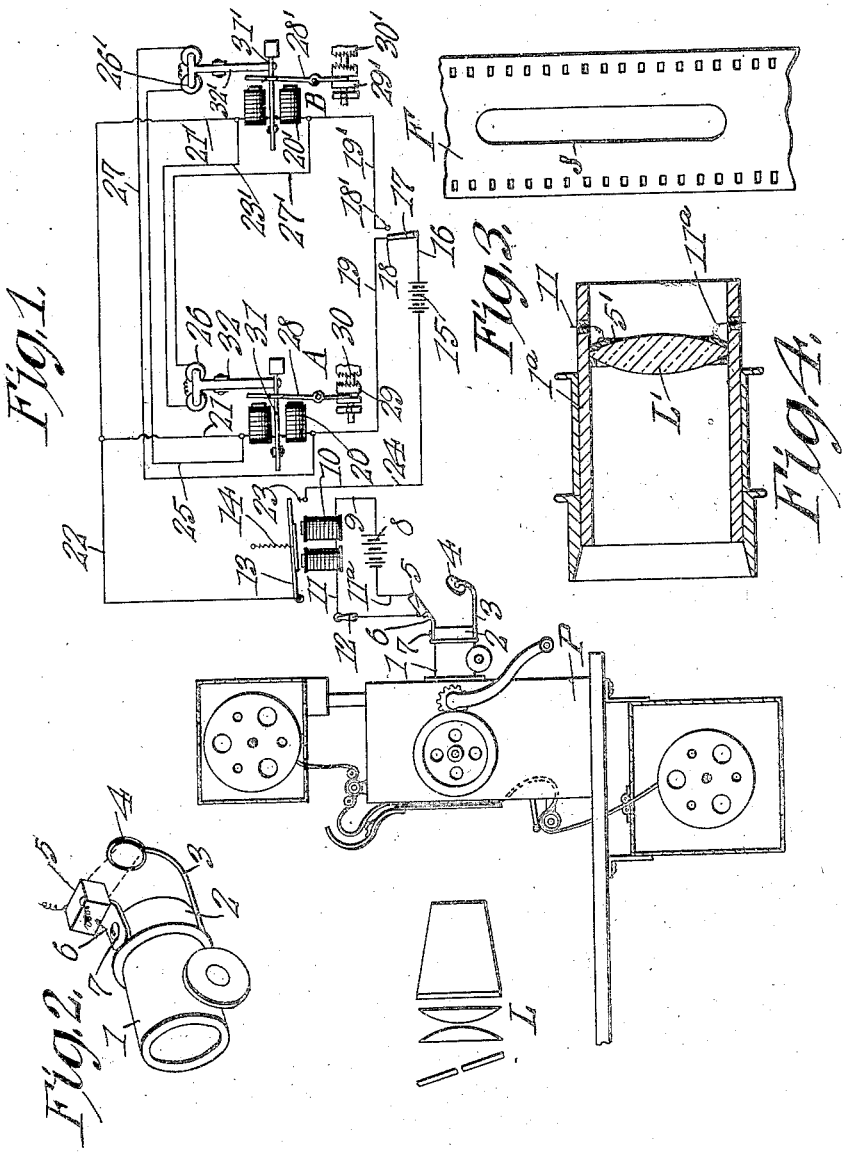

C. W. EBELING.
FILM CONTROLLED MECHANISM FOR SYNCHRONIZED MOTION PICTURE AND SOUND RECORD CARRIERS.
APPLICATION FILED NOV. 18, 1916.
1,254,487.
Patented Jan. 22, 1918.
2 SHEETS—SHEET 2.
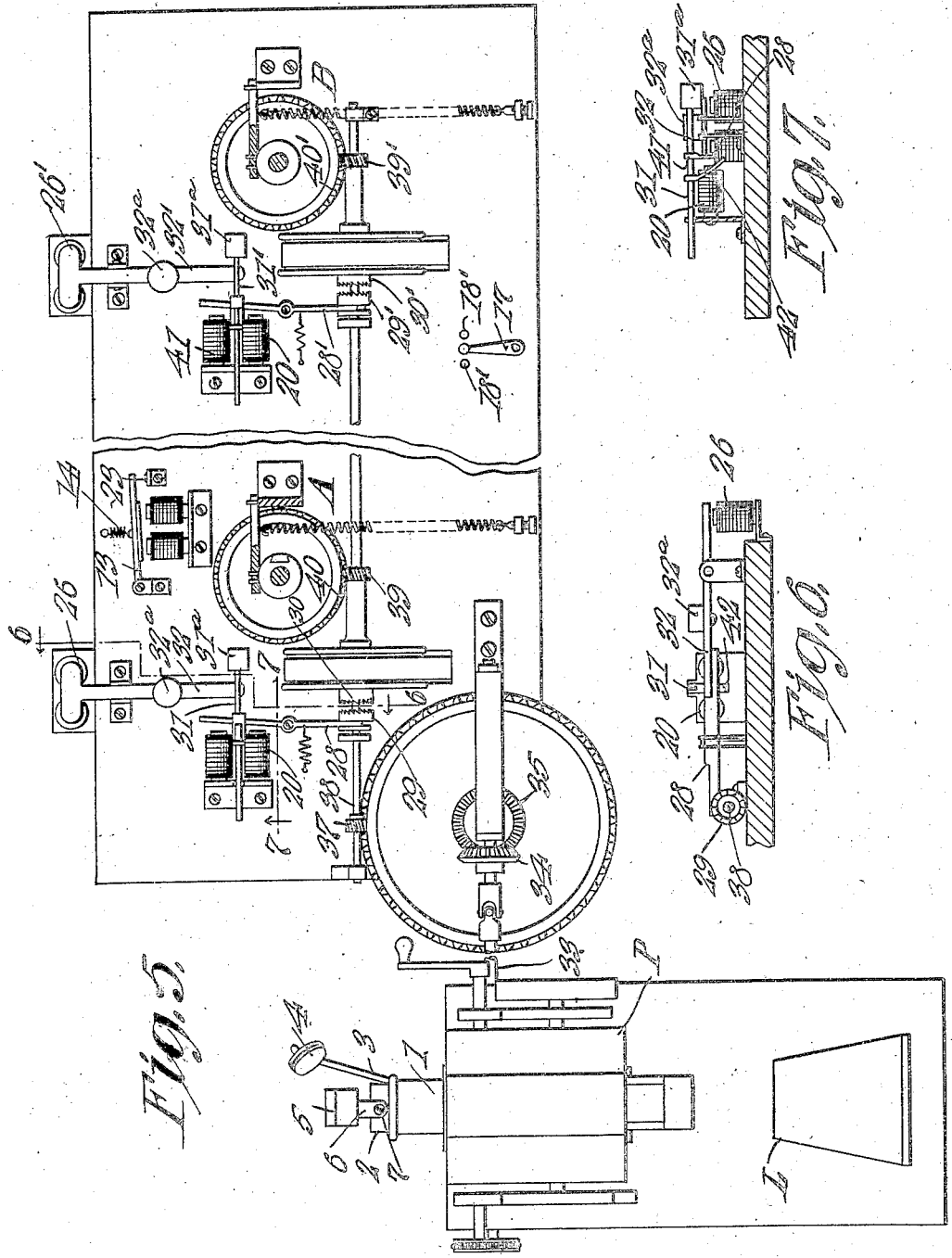
Witnesses
Inventor
C. W. Ebeling
by
Attorneys

UNITED STATES PATENT OFFICE.

CHARLES W. EBELING, OF WHEELING, WEST VIRGINIA.

FILM-CONTROLLED MECHANISM FOR SYNCHRONIZED MOTION-PICTURE AND SOUND-RECORD CARRIERS.

1,254,487.

Specification of Letters Patent.

Patented Jan. 22, 1918.

Application filed November 18, 1916. Serial No. 132,123.

*To all whom it may concern:*

Be it known that I, CHARLES W. EBELING, a citizen of the United States, residing at Wheeling, in the county of Ohio and State of West Virginia, have invented a new and useful Film-Controlled Mechanism for Synchronized Motion-Picture and Sound-Record Carriers, of which the following is a specification.

The present invention relates to improvements in film controlled mechanism for motion picture and sound reproducing machines, one object of the invention, being the provision of electrically operated clutch controlling means for determining the synchronous operation of one or more sound record carriers relatively to a motion picture projector, a circuit including the electromagnetic clutches being primarily controlled by a selenium cell which in turn has its resistance effected by the reflected rays of light from the motion picture projector, there being provided in the film an open slot or transparent light ray unobstructing portion at the selected point for permitting the intense rays of light to be reflected to effect the selenium cell, the film under ordinary conditions preventing the rays from reducing the resistance to close the primary circuit.

A further object of this invention is the provision of a simple circuit controlling means adapted to be acted upon by the light rays projected from the lens of the motion picture projecting machine and which only necessitates the attachment of the present device to the machine and the erasure from the film of a predetermined portion of the sensitized gelatin so that a transparent portion of the film is provided without weakening the film.

With the foregoing and other objects in view which will appear as the description proceeds, the invention resides in the combination and arrangement of parts, and in the details of construction hereinafter described and claimed, it being understood that changes in the precise embodiment of the invention herein disclosed can be made within the scope of what is claimed, without departing from the spirit of the invention.

In the drawings:—

Figure 1 is a diagrammatic view of a motion picture projector and the clutch operating electromagnets of two rotary sound record carriers for sound reproducing machines showing the present selenium cell control in operable relation thereto.

Fig. 2 is a perspective view of the lens tube of a motion picture projector with the reflecting mirror and the selenium cell attached thereto.

Fig. 3 is a plan view of a portion of the film showing one method of producing a transparent or light ray unobstructing space for the projection of the light rays therethrough to affect the selenium cell.

Fig. 4 shows a modified form of mounting the selenium cell within the lens tube.

Fig. 5 is a diagrammatic top plan view of a motion picture projector and a double sound record carrier mechanism showing the present invention installed.

Fig. 6 is a section taken on line 6—6 of Fig. 5.

Fig. 7 is a section taken on line 7—7 of Fig. 5.

Referring to the drawings, L designates diagrammatically, the lamp house of a motion picture projector machine P, which is provided with the lens tube 1 of usual construction, having attached at the under side to the forward portion thereof, the arm or bracket 3 which carries the reflecting member or mirror 4, the same being disposed within the rays of light from the lens. It has been found in practice, that this mirror has no detrimental effect upon the projection of the scene upon the screen even when placed in comparatively close proximity to the lens tube, as illustrated in Figs. 1 and 2.

The bracket 6 which carries the selenium cell 5, is attached by the screw 7 to the upper portion of the tube 1 and thus is out of the direct rays of light therefrom, the same, however, being disposed to receive the reflected rays from the mirror 4, so that the resistance of the cell 5 may be varied according to the reflected rays to close the following primary circuit.

This circuit includes the battery 8, the conductor 9, the relay 10, the conductor 11 provided with the switch 12, the selenium cell 5 and the conductor 11$^a$.

In the present instance, there is shown diagrammatically in Fig. 1, two sound record carrier controls A and B. The corresponding parts in the machine B are primed, so that the description of one will suffice for both.

The relay 10 controls its armature switch 13 which is normally held away from the relay by means of the spring 14.

As illustrated in Fig. 1, when the armature 13 is in contact with the contact point 23, the relay 10 being energized, the following circuit will be closed. This circuit includes the battery 15, the conductor 16, the hand controlled switch 17, the contact point 18, the conductor 19, the electromagnet 20, the conductors 21 and 22, the armature 13, the contact 23 and the conductor 24. Connected in multiple to the conductors 19 and 21 are the conductors 25 and 27, which permit the current to be distributed to the releasing electromagnet 26' of the machine B. Thus when the circuit including the battery 15 with the switch 17, as shown in Fig. 1 is closed, the clutch throwing electromagnet 20 of the machine A is energized, while the clutch releasing electromagnet 26' of the machine B is energized. Thus the machine B is disconnected from operation while the machine A is connected for operation, and vice versa.

When the switch point 17 is shifted to engage with the switch point 18', the electromagnets 20' and 26 are energized, thus throwing in the clutch of the machine B and throwing out the clutch in the machine A.

The armature 28, and the electromagnet 20 are operably connected to the slidable clutch member 29 which is disposed to co-operate with the clutch member 30 for operating the carrier of the machine A (not shown). The weight actuated lever 31 is disposed to lock the armature 28 in clutch thrown position, while the electromagnet 26 operates the armature 32 so as to release the weight actuated arm 31 and permit the armature lever 28 to return to clutch opening position.

The present mechanism which is shown merely diagrammatically, is set forth in detail and forms a part of a copending application Serial No. 873,548, filed November 23, 1914.

In order, however, that the present installation will be fully understood, the detail structure shown in Figs. 5, 6 and 7 is hereto referred to.

In this construction, the projector operates through the shaft 33, the bevel pinion 34, which in turn is in mesh with the bevel pinion 35 connected to and carried by the large worm gear 36. This worm gear 36 is so journaled as to mesh with the worm gear 37 and thus operate the drive shaft 38 of the two machines A and B.

As before described, the clutch members 29 and 30, and 29' and 30' are connected to the shaft 38 to in turn operate the driven worm gears 39 and 39', which in turn operate the record carrier actuating gears 40 and 40'.

As there illustrated, the armature 32 is provided with the weight 32ᵃ which normally holds the free end of the armature below the lever 31, which is actuated by the weight 31ᵃ, there being attached to the lever 31, a locking member 41 and a returning member 42, such locking member being disposed in the path to lock the electromagnetically actuated clutch throwing lever 28—28' to hold the same in clutch closed position while the returning member 42 is carried thereby so as to operate the lever 28 when the lever 31 is elevated by the armature 32 due to the energization of the electromagnet 26—26'. Thus upon the energization of the electromagnet 20, the clutch is thrown in as the armature 28 is attracted, the free end of such armature being placed under the locking member 41 and due to the weight 31ᵃ being held in such locked position with the clutch thrown in.

The film F, as shown in Fig. 3, in order to cause the desired effect upon the selenium cell 5 is provided with the transparent light ray unobstructing portion S which may be in the nature of a slot formed in the film longitudinally thereof or may be formed by shaving from the surface of the film the sensitized gelatin so that such portion of the film when disposed between the cone of the lamp house L will permit of the projection through the lens tube 1 of the intense or full effect of the rays of light from the lamp, the same being reflected by the mirror 4 upon the selenium cell 5, whose resistance is reduced thereby to permit the current from the battery 8 to flow therethrough and thus energize the relay 10. This action as before stated, attracts the armature 13 and causes the circuit to control the clutch throwing electromagnets 20—26' and 20'—26 as elected.

It is essential to the operation of the present device, that the rays of light to affect the selenium cell, be unobstructed, for even apparently clear portions of the sensitized gelatin carried by the film will interfere and prevent such rays from properly affecting the cell. Therefore either a slot is cut longitudinally through the body of the film, or the sensitized gelatin is removed to produce a space that will be clear and not obstruct the rays of light.

As seen in Fig. 4, the lens tube 1ᵃ having the lens L' therein, is so constructed that the selenium cell 5' is disposed to constitute a support or ring for the lens, said selenium cell 5' being constructed in one or more sections as may be found expedient. In this case, the conductor wires 11 and 11ᵃ are connected to the selenium cell, as illustrated in diagram in Fig. 1.

It is apparent from the foregoing description, that the present device may be readily applied to any of the projector machines now in use, with merely the necessity of attaching the arm 3 and bracket 6 to the lens tube, or said bracket and arm may be carried by a singe clamp to be attached to the lens tube, thus without interfering with any mechanism in the aperture door or in the portion adjacent the film as is customary where the film carries a switch closing means.

What is claimed is:—

1. The combination with a lamp house, having a lamp, a motion picture projector machine having a lens tube and a sound reproducing machine for operation in synchronism with the projector machine, of a film provided with a light ray unobstructing portion, and means set in motion by the light rays projected through the unobstructing portion of the film to control the communication of motion from one machine to the other.

2. The combination with a lamp house, having a lamp, a motion picture projector machine having a lens tube and a sound reproducing machine for operation in synchronism with the projector machine, of a film provided with a light ray unobstructing portion, and means set in motion by the light rays projected through the unobstructing portion of the film to control the communication of motion from one machine to the other, said latter means including a selenium cell controlled electrical circuit.

3. The combination with a lamp house having a lamp, a motion picture projector machine having a lens tube, a film provided with a light ray unobstructing portion, and a sound reproducing machine for operation in synchronism with the projector machine, of an electrical means for setting in motion the sound reproducing machine when the unobstructing portion of the film is interposed between the lamp and the lens tube, said latter means including a primary circuit having a selenium cell, said cell being disposed to be affected by the rays of light from the lens.

4. The combination with a lamp house having a lamp, a motion picture projector machine having a lens tube, a film provided with a light ray unobstructing portion, and a sound reproducing machine for operation in synchronism with the projector machine, of an electrical means for setting in motion the sound reproducing machine when the unobstructing portion of the film is interposed between the lamp and the lens tube, said latter means including a primary circuit, having a source of electrical energy, a relay, and a selenium cell in said circuit, said selenium cell being disposed to be affected by the rays of light from the lens.

5. The combination with a lamp house having a lamp, a motion picture projector machine having a lens tube, a film provided with a light ray unobstructing portion, and a sound reproducing machine for operation in synchronism with the projector machine, of an electrical means for setting in motion the sound reproducing machine when the unobstructing portion is interposed between the lamp and the lens tube, said latter means including a primary circuit having a source of electrical energy, a relay, a selenium cell being disposed to be affected by the rays of light from the lens, and a mirror disposed in the rays of light to reflect the rays of light from the lens upon the selenium cell.

6. The combination with a motion picture projector machine, a film provided with a light ray unobstructing portion and a sound reproducing machine connected for synchronous operation, of electrical means for connecting one to the other and including a selenium cell controlled circuit to be affected by the projected rays from the motion picture machine after passage through the light ray unobstructing portion of the film.

7. The combination with a motion picture projector machine having a lens tube, a film provided with a light ray unobstructing portion, and a sound reproducing machine, both of said machines being connected for synchronous operation, of electrical means for connecting one machine to the other, and including a primary circuit including a source of electrical energy, an electro-magnet, and a selenium cell, said cell being disposed to receive the rays of light from the lens and after passage through the unobstructed portion of the film.

8. The combination with a motion picture projector machine having a lens tube, a film provided with light ray unobstructing portion, and a sound reproducing machine, both of said machines being connected for synchronous operation, of electrical means for connecting one machine to the other, and including a primary circuit including a source of electrical energy, an electro-magnet, a selenium cell, said cell being disposed to receive the rays of light from the lens, and a reflecting mirror attached to the lens tube and disposed to reflect the rays of light projected through the light ray unobstructing portion of the film and the lens upon the selenium cell.

9. The combination with a motion picture projector machine having a lens tube, a film having a light ray unobstructing portion, and a sound reproducing machine connected to the motion picture machine for synchronous operation, of electrical means for controlling the operation of one of the machines relatively to the other, and including a primary electrical circuit including a source of electrical energy and an electro-magnet, and a selenium cell in said circuit and disposed to be affected by the rays of light after passage through the unobstructing portion of the film, and a secondary electrical circuit including a source of electrical energy, an electro-magnet, and a switch, the switch being controlled by the electro-magnet of the primary circuit.

10. The combination with a motion picture projector machine having a lens tube, a film having a light ray unobstructing portion, and a sound reproducing machine connected to the motion picture machine for synchronous operation, of electrical means for controlling the operation of one of the machines relatively to the other, and including an electrical circuit including a source of electrical energy and an electro-magnet, a selenium cell in said circuit and disposed to be affected by the rays of light after passage through the unobstructing portion of the film, and a mirror attached to direct the rays of light from the lens tube against the selenium cell.

11. The combination with a motion picture machine having a lens tube, a film having a light ray unobstructing portion, and an electrical clutch throwing means, of electrical means for operating the electrical clutch throwing means, including a relay circuit having a source of electrical energy and an electro-magnet, and a selenium cell in said circuit for disposition in the path to be affected by the rays of light from the lens tube when projected through the unobstructed portion of the film.

12. The combination with a motion picture machine having a lens tube, a film having a light ray unobstructing portion, and an electrical clutch throwing means, of electrical means for operating the electrical clutch throwing means, including a relay circuit having a source of electrical energy and an electro-magnet, a selenium cell in said circuit for disposition in the path to be affected by the rays of light from the lens tube when projected through the unobstructed portion of the film, and a mirror attached to the lens tube for reflecting the rays therefrom upon the selenium cell.

In testimony that I claim the foregoing as my own, I have hereto affixed my signature in the presence of two witnesses.

CHAS. W. EBELING.

Witnesses:
    EDWARD C. REEB,
    SAMUEL RAUTENBERG.